(12) United States Patent
Higashitani

(10) Patent No.: US 8,619,342 B2
(45) Date of Patent: Dec. 31, 2013

(54) IMAGE READING APPARATUS AND IMAGE FORMING APPARATUS

(75) Inventor: Masahiro Higashitani, Osaka (JP)

(73) Assignee: Kyocera Mita Corporation (JP)

( * ) Notice: Subject to any disclaimer, the term of this patent is extended or adjusted under 35 U.S.C. 154(b) by 232 days.

(21) Appl. No.: 13/302,437

(22) Filed: Nov. 22, 2011

(65) Prior Publication Data
US 2012/0133997 A1 May 31, 2012

(30) Foreign Application Priority Data
Nov. 30, 2010 (JP) ................................. 2010-266308

(51) Int. Cl.
*H04N 1/04* (2006.01)
*H04N 1/46* (2006.01)
*G02B 6/26* (2006.01)
*G03G 15/04* (2006.01)
*B41J 2/45* (2006.01)

(52) U.S. Cl.
USPC ........... 358/474; 358/475; 358/509; 358/497; 385/27; 399/220; 347/238

(58) Field of Classification Search
USPC .................... 358/474, 475, 509, 497; 385/27; 399/220; 347/238
See application file for complete search history.

(56) References Cited

U.S. PATENT DOCUMENTS

| | | | | |
|---|---|---|---|---|
| 8,169,671 B2* | 5/2012 | Itoh et al. | ....................... | 358/474 |
| 8,253,989 B2* | 8/2012 | Nishina et al. | ................ | 358/474 |
| 8,385,781 B2* | 2/2013 | Okamoto | ....................... | 399/221 |
| 8,416,471 B2* | 4/2013 | Takaura et al. | ................ | 358/474 |
| 8,488,216 B2* | 7/2013 | Sakamoto et al. | ............. | 358/475 |
| 2006/0181603 A1* | 8/2006 | Ogura et al. | ................... | 347/238 |
| 2008/0180774 A1* | 7/2008 | Tatsuno | ......................... | 359/208 |
| 2009/0290199 A1 | 11/2009 | Tagawa et al. | | |
| 2009/0316224 A1* | 12/2009 | Kawamura et al. | ............ | 358/474 |
| 2009/0323139 A1* | 12/2009 | Itoh et al. | ....................... | 358/474 |
| 2010/0012852 A1 | 1/2010 | Higashitani et al. | | |
| 2010/0027079 A1* | 2/2010 | Nishina et al. | ................ | 358/474 |
| 2011/0164899 A1* | 7/2011 | Suto et al. | ...................... | 399/220 |
| 2011/0199652 A1* | 8/2011 | Imoto et al. | .................... | 358/474 |
| 2012/0128298 A1* | 5/2012 | Tsao et al. | ....................... | 385/27 |

FOREIGN PATENT DOCUMENTS

JP    2007-158556    6/2007

* cited by examiner

*Primary Examiner* — Charlotte M Baker
*Assistant Examiner* — Rury Grisham
(74) *Attorney, Agent, or Firm* — Gerald E. Hespos; Michael J. Porco; Matthew T. Hespos

(57) ABSTRACT

An image reading apparatus includes a light guide arranged between a light source and a document. The light guide has a light incident surface at a side of the light source, light from the light source, is incident, a first light emitting surface at a side of the document, a second light emitting surface different from the first light emitting surface, a first reflecting surface between the first and second light emitting surfaces, a second reflecting surface between the light incident surface and the second light emitting surface, and a third reflecting surface facing the second reflecting surface. The first reflecting surface reflects light toward the first light emitting surface. The second reflecting surface reflects light toward one of the second light emitting surface and the first and third reflecting surfaces. The third reflecting surface reflects light toward the second light emitting surface or the first reflecting surface.

10 Claims, 10 Drawing Sheets

FIG.7

| | OPTICAL PATH IN LIGHT GUIDE | NUMBER OF REFLECTIONS | OPTICAL PATH TO DOCUMENT SURFACE |
|---|---|---|---|
| (1) | | 1 | INDIRECT LIGHT |
| (2) | | 2 | DIRECT LIGHT |
| (3) | | 1 | DIRECT LIGHT |
| (4) | | 0 | INDIRECT LIGHT |
| (5) | | 1 | INDIRECT LIGHT |
| (6) | | 2 | DIRECT LIGHT |
| (7) | | 3 | DIRECT LIGHT |

IMAGE READING APPARATUS AND IMAGE FORMING APPARATUS

BACKGROUND OF THE INVENTION

1. Field of the Invention

The present invention relates to an image reading apparatus and an image forming apparatus capable of efficiently irradiating a document with light from a light source.

2. Description of the Related Art

An image reading apparatus including an illuminator for irradiating a document with light, a mirror for forming an optical path by reflecting the light reflected by the document, an imaging lens for imaging this light and a CCD (Charge Coupled Device) for reading an image of a document from the imaged light is known as an image reading apparatus for optically reading a document image.

An image reading apparatus using a light guide is also known. The light guide is arranged in an optical path between a light source and a document and a light emitting surface thereof is obliquely and flatly cut. The light totally reflected by the light emitting surface is totally reflected in the light guide and, thereafter, emitted toward an object to be irradiated such as a document without being reflected by any surface of the light guide.

However, since only total reflection is utilized and the light emitting surface is a flat surface in the above light guide, much light is irradiated outside an effective irradiation range. Further, the light is poorly condensed to the object to be irradiated. Furthermore, since the light guide needs to be arranged at a position distant from a reading position in order to guide the totally reflected light to the object to be irradiated, there has been a problem of being difficult to downsize the apparatus.

SUMMARY OF THE INVENTION

An object of the present invention is to provide an image reading apparatus and an image forming apparatus for efficiently irradiating a document with light from a light source and reading an image of the document.

In order to achieve this object, one aspect of the present invention is directed to an image reading apparatus for optically reading an image of a document, including: a light source for emitting light for irradiating the document; a light guide arranged between the light source and the document and having a light incident surface on which light emitted from the light source is incident at a side of the light source, a first light emitting surface from which the light is emitted at a side of the document, a second light emitting surface which is located on a surface different from the one including the first light emitting surface and from which light is emitted, a first reflecting surface arranged between the first and second light emitting surfaces, a second reflecting surface arranged between the light incident surface and the second light emitting surface, and a third reflecting surface facing the second reflecting surface; a reflecting member for reflecting light emitted from the second light emitting surface toward the document; one or more mirrors for forming an optical path by reflecting light reflected by the document; an imaging lens for imaging the light reflected by the one or more mirrors; and an image reader arranged at an imaging position of the imaging lens and adapted to read the image of the document based on imaging by the imaging lens; wherein: the first reflecting surface is oriented to reflect light received thereby toward the first light emitting surface; the second reflecting surface is oriented to reflect light received thereby toward any one of the second light emitting surface, the first reflecting surface and the third reflecting surface; and the third reflecting surface is oriented to reflect light received thereby toward either the second light emitting surface or the first reflecting surface.

Another aspect of the present invention is directed to an image forming apparatus, including an image reading apparatus for optically reading an image of a document; and an image forming unit for forming an image on a sheet based on an image read by the image reading apparatus, wherein this image reading apparatus has the above construction.

Objects, features and advantages of the present invention will become more apparent upon reading the following detailed description along with the accompanying drawings.

DETAILED DESCRIPTION OF THE PREFERRED EMBODIMENTS

Figure 1:
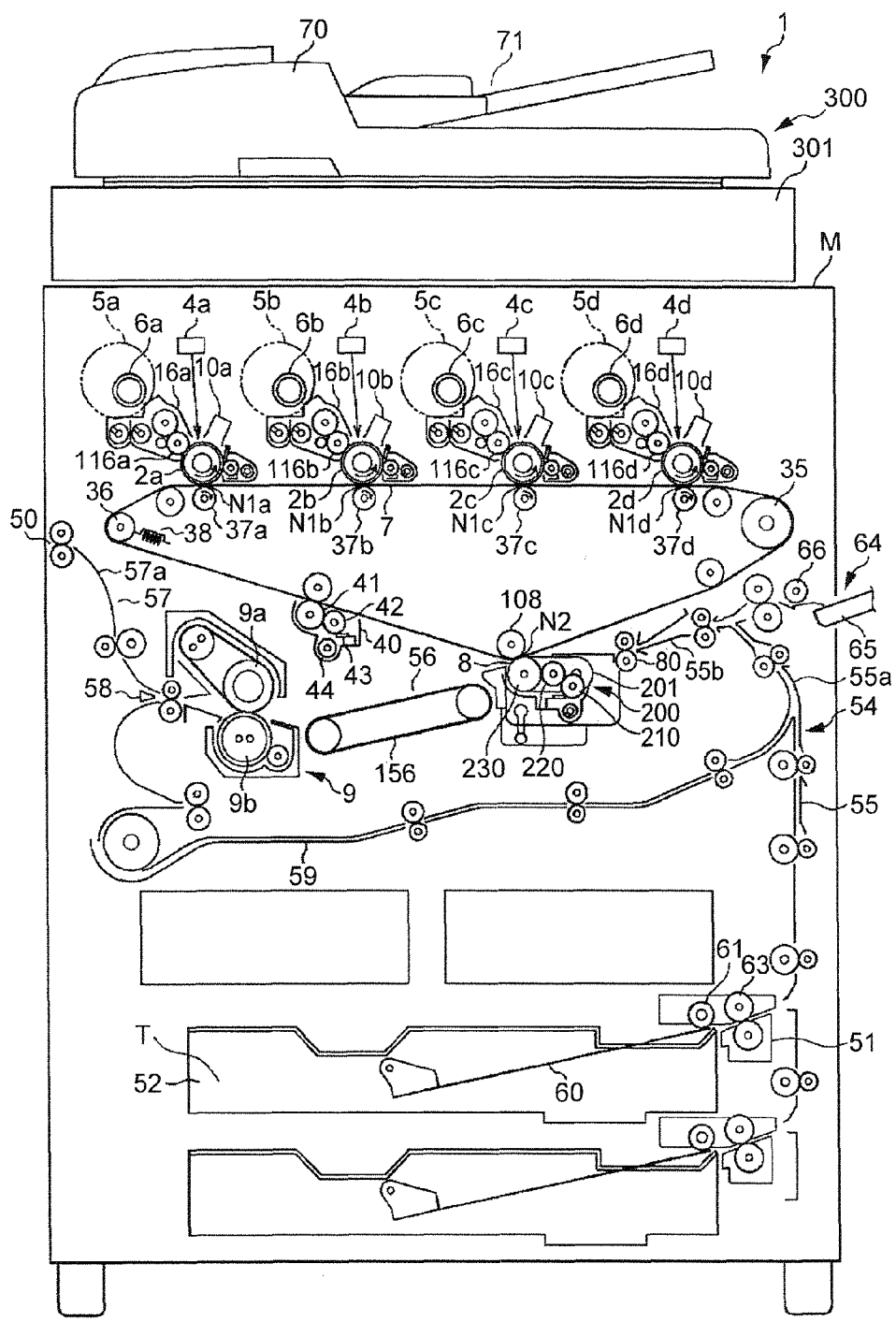
FIG. 1 is a schematic diagram showing the internal structure of an image forming apparatus.
Figure 2:
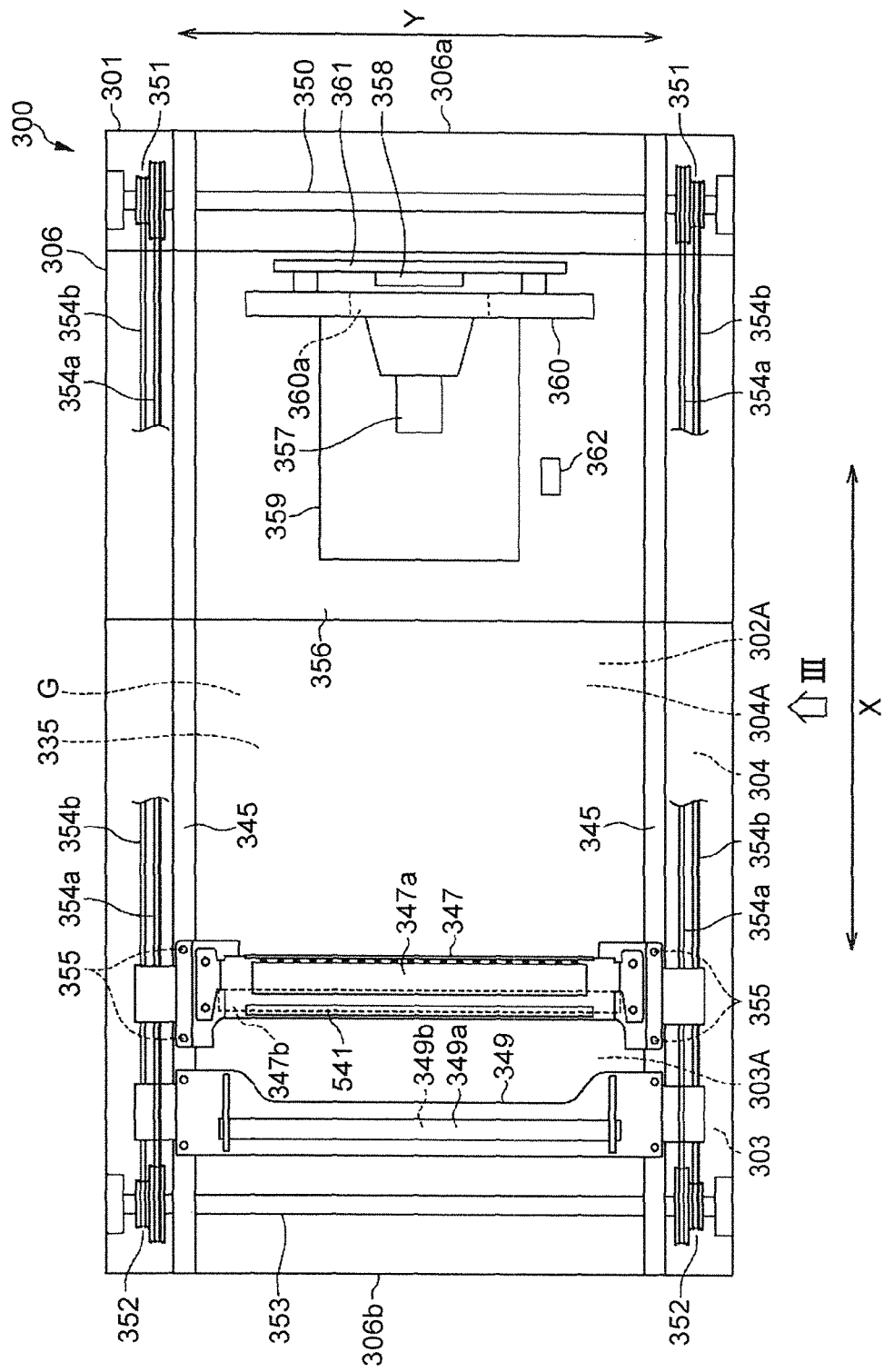
FIG. 2 is a schematic plan view showing the internal structure of a reader (image reading apparatus)
Figure 3:
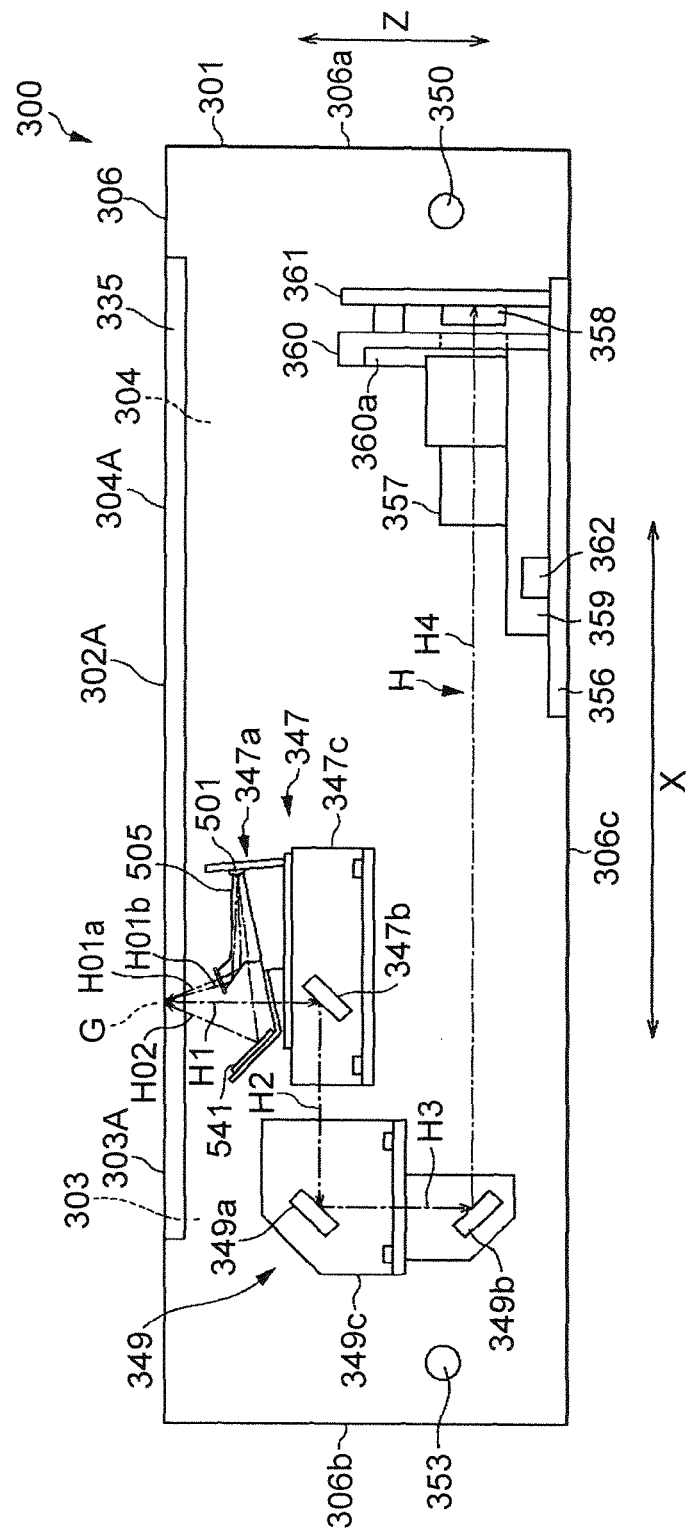
FIG. 3 is a side view of the reader shown in FIG. 2 when viewed in a direction of an arrow III.

Hereinafter, an embodiment of the present invention is described in detail with reference to the drawings. First, using FIGS. 1 to 3, an image forming apparatus 1 as one embodiment of the present invention is described. FIG. 1 is a schematic diagram showing the internal structure of the image forming apparatus 1, FIG. 2 is a schematic plan view showing the internal structure of a reader 301, and FIG. 3 is a view of the reader 301 of FIG. 2 when viewed in a direction of an arrow III. Note that although this embodiment is described, taking the image forming apparatus as an example, the present invention can also be realized only by an image reading apparatus 300 to be described later. Further, in this embodiment, a side where a manual feed tray 65 to be described later (right side in FIG. 1) is referred to as a front side of the image forming apparatus 1.

The image forming apparatus 1 includes the image reading apparatus 300 arranged at an upper side and an apparatus main body M arranged at a lower side for forming a toner image on a sheet T based on image information from the image reading apparatus 300. The image reading apparatus 300 includes a document feeder 70 for feeding a document G to a document reading position and the reader 301 for reading an image of the document G. The document feeder 70 is openably and closably connected to the reader 301 via an unillustrated connecting part and has also a function of protecting a reading surface 302A to be described later.

When the document feeder 70 is closed with respect to the reader 301, a document G is placed on a document placing portion 71 provided on the upper surface of the document feeder 70. The document G placed on the document placing portion 71 is moved to a first reading surface 303A constituting the reading surface 302A in the reader 301 by an unillustrated feed roller. In this case, an illumination unit 347 and a mirror unit 349 to be described later are fixed at a first position 303. By moving the document G in such a manner as to slide on the first reading surface 303A, an image formed on a surface of the document G is read by a CCD 358 (image reader).

When the document feeder 70 is open with respect to the reader 301, a document G is placed on a second reading surface 304A constituting the reading surface 302A. In this case, the illumination unit 347 and the mirror unit 349 are arranged at a second position 304 and respectively moved in a sub scanning direction X at the second position 304. The illumination unit 347 and the mirror unit 349 are moved while keeping the length of an optical path H (optical path length) to be described later constant. In this way, an image of the document G placed on the second reading surface 304A is read.

The apparatus main body M includes, as an image forming unit for forming an image on a sheet T based on an image read by the image reading apparatus 300, photoconductive drums 2a, 2b, 2c and 2d as image bearing members, chargers 10a, 10b, 10c and 10d, laser scanner units 4a, 4b, 4c and 4d, developing devices 16a, 16b, 16c and 16d, toner cartridges 5a, 5b, 5c and 5d, toner supply devices 6a, 6b, 6c and 6d, an intermediate transfer belt 7, primary transfer rollers 37a, 37b, 37c and 37d, an intermediate transfer unit 200 including a secondary transfer roller 8, and a fixing device 9. The apparatus main body M also includes sheet cassettes 52 which are withdrawably arranged at a bottom side of the apparatus main body M and in which sheets T are stored in a stacked state, and a conveyance path 54 for conveying sheets T fed from the sheet cassettes 52.

The photoconductive drums 2a, 2b, 2c and 2d are cylindrical members and arranged rotatably in directions of arrows about rotary shafts perpendicular to the plane of FIG. 1. Electrostatic latent images are formed on surfaces of the respective photoconductive drums 2a, 2b, 2c and 2d. The chargers 10a, 10b, 10c and 10d are arranged above the corresponding photoconductive drums 2a, 2b, 2c and 2d to uniformly and positively (positive polarity) charge the respective surfaces of the photoconductive drums 2a, 2b, 2c and 2d.

The laser scanner units 4a, 4b, 4c and 4d are arranged above and spaced apart from the respective photoconductive drums 2a, 2b, 2c and 2d, and include unillustrated laser light sources, polygon mirrors, motors for driving the polygon mirrors and the like. The respective laser scanner units 4a, 4b, 4c and 4d scan and expose the surfaces of the photoconductive drums 2a, 2b, 2c and 2d based on image information on an image read by the reader 301. In this way, electric charges on the respective surfaces of the photoconductive drums 2a, 2b, 2c and 2d are removed to form electrostatic latent images.

The respective developing devices 16a, 16b, 16c and 16d are arranged lateral to (left side in FIG. 1) the photoconductive drums 2a, 2b, 2c and 2d and supply toners of the respective colors to the electrostatic latent images formed on the photoconductive drums 2a, 2b, 2c and 2d to develop the electrostatic latent images into toner images. The respective developing devices 16a, 16b, 16c and 16d correspond to four toner colors of yellow, cyan, magenta and black and include developing rollers 116a, 116b, 116c and 116d which can be arranged to face the photoconductive drums 2a, 2b, 2c and 2d and agitation rollers for toner agitation.

The respective toner cartridges 5a, 5b, 5c and 5d store the toners of the respective colors to be supplied to the corresponding developing devices 16a, 16b, 16c and 16d; in this embodiment, store yellow toner, cyan toner, magenta toner and black toner. The respective toner supply devices 6a, 6b, 6c and 6d supply the toners of the respective colors stored in the respective toner cartridges 5a, 5b, 5c and 5d to the corresponding developing devices 16a, 16b, 16c and 16d.

Toner images of the respective colors developed on the photoconductive drums 2a, 2b, 2c and 2d are successively transferred to the intermediate transfer belt 7. The intermediate transfer belt 7 is arranged while being mounted between a drive roller 35 and a tension roller 36. Since the tension roller 36 is biased toward a side away from the drive roller 35 by a spring 38, a predetermined tension is given to the intermediate transfer belt 7.

At a side of the intermediate transfer belt 7 opposite to the photoconductive drums 2a, 2b, 2c and 2d, primary transfer rollers 37a, 37b, 37c and 37d are respectively arranged to face the intermediate transfer belt 7. Specific parts of the intermediate transfer belt 7 are sandwiched between the respective primary transfer rollers 37a, 37b, 37c and 37d and the photoconductive drums 2a, 2b, 2c and 2d. These sandwiched specific parts are pressed against the surfaces of the respective photoconductive drums 2a, 2b, 2c and 2d. Primary transfer nips N1a, N1b, N1c and N1d are formed in this way, and the toner images of the respective colors developed on the respective photoconductive drums 2a, 2b, 2c and 2d are successively transferred to the intermediate transfer belt 7. In this way, a full color toner image is formed on the intermediate transfer belt 7.

Primary transfer biases for transferring the toner images of the respective colors developed on the respective photoconductive drums 2a, 2b, 2c and 2d to the intermediate transfer belt 7 are applied to the respective primary transfer rollers 37a, 37b, 37c and 37d by unillustrated voltage applying devices.

The secondary transfer roller 8 transfers the toner image primarily transferred to the intermediate transfer belt 7 to a sheet T. A secondary transfer bias for transferring the toner image on the intermediate transfer belt 7 to the sheet T is applied to the secondary transfer roller 8 by an unillustrated voltage applying device.

The second transfer roller 8 is movable toward and away from the intermediate transfer belt 7. Specifically, the secondary transfer roller 8 is movable between a contact position where it is held in contact with the intermediate transfer belt 7 and a separated position where it is separated from the intermediate transfer belt 7. More specifically, the secondary transfer roller 8 is moved to the contact position in the case of secondarily transferring a toner image primarily transferred to the surface of the intermediate transfer belt 7 to a sheet T while being moved to the separated position in the case of performing no secondary transfer. Here, approaching and separating movements of the secondary transfer roller 8 are made by rotating the entire intermediate transfer unit 200.

The intermediate transfer unit 200 includes a housing 201 which houses the secondary transfer roller 8 and rotatably supports the secondary transfer roller 8, a rotation drive gear 210 arranged on a side surface of the housing 201, a roller-side gear 230 extending in a direction of a rotation axis of the secondary transfer roller 8 and arranged on the side surface of the housing 201, and an idle gear 220 arranged in contact with the rotation drive gear 210 and the roller-side gear 230. The intermediate transfer unit 200 is moved by being rotated about an unillustrated rotation axis between a contact position where the secondary transfer roller 8 is in contact with the intermediate transfer belt 7 and a separated position where the secondary transfer roller 8 is not in contact with the intermediate transfer belt 7 by an unillustrated moving mechanism.

A facing roller 108 is arranged on a side of the intermediate transfer belt 7 facing the secondary transfer roller 8. A specific part of the intermediate transfer belt 7 is sandwiched between the secondary transfer roller 8 and the facing roller 108. The sheet T is pressed against the surface (side where the image is primarily transferred) of the intermediate transfer belt 7. In this way, a secondary transfer nip N2 is formed and the toner image primarily transferred to the intermediate transfer belt 7 is secondarily transferred to the sheet T.

The fixing device 9 melts the toners of the respective colors constituting the toner image secondarily transferred to the sheet T and fixes them to the sheet T. The fixing device 9 includes a heating roller 9*a* heated by a heater and a pressure roller 9*b* pressed in contact with the heating roller 9*a*. The heating roller 9*a* and the pressure roller 9*b* convey the sheet T having the toner image secondarily transferred thereto while sandwiching it. By being so conveyed as to be sandwiched between the heating roller 9*a* and the pressure roller 9*b*, the toner transferred to the sheet T is melted and fixed to the sheet T.

A belt cleaner 40 for cleaning the intermediate transfer belt 7 is arranged between the secondary transfer roller 8 and the tension roller 36. The belt cleaner 40 includes a cleaning brush 41 to be held in sliding contact with the surface of the intermediate transfer belt 7, a cleaning roller 42 arranged in contact with the cleaning brush 41, a blade 43 with a leading end arranged in contact with the surface of the cleaning roller 42, and a collecting spiral 44 arranged below the blade 43.

The sheet cassettes 52 storing sheets T are so arranged at the bottom side in the apparatus main body M as to be withdrawable in a horizontal direction. The sheet cassettes 52 store the sheets T in a stacked state, and placing plates 60 on which the sheets T are placed are arranged inside them. The sheets T placed on each placing plate 60 are fed to the conveyance path 54 by a cassette feeding unit 51 arranged at an end of the sheet cassette 52 where the sheets are fed (right end in FIG. 1). Each sheet feeding unit 51 includes a forward roller 61 for picking up the sheets T on the placing plate 60 and a multiple feed preventing mechanism composed of a pair of feed rollers 63 for feeding the sheets T one by one to the conveyance path 54.

The conveyance path 54 for conveying the sheets T is formed between the cassette feeding unit 51 and a discharge unit 50. The conveyance path 54 includes a first conveyance path 55 from the cassette feeding units 51 to the secondary transfer roller 8, a second conveyance path 56 from the secondary transfer roller 8 to the fixing device 9, and a third conveyance path 57 from the fixing device 9 to the discharge unit 50. A switching claw 58 is provided at the exit of the fixing device 9, and a return conveyance path 59 for returning the sheet T to the first conveyance path 55 is formed between this switching claw 58 and a curved path 55*a* to be described later in the first conveyance path 55.

The first conveyance path 55 includes the curved path 55*a* for turning a conveying direction to the left in FIG. 1 while conveying the sheet T fed from the sheet cassette 52 upward, and a straight path 55*b* from the curved path 55*a* to the secondary transfer roller 8. Guide plates and pairs of rollers for conveying the sheet T while guiding the sheet T are arranged in the first conveyance path 55. Further, a sensor for detecting the sheet T and a pair of registration rollers 80 for correcting skew (oblique feed) of the sheet T and timing the feed of the sheet T with a toner image are arranged in the first conveyance path 55. The sensor is arranged immediately before (upstream side) of the pair of registration rollers 80 in the conveying direction of the sheet T. The pair of registration rollers 80 convey the sheet T while performing the above correction and timing adjustment based on detection information from the sensor.

The second conveyance path 56 is a straight conveyance path inclined downwardly toward the fixing device 9. A conveyor belt 156 for conveying the sheet T while carrying it thereon is arranged in the second conveyance path 56. Further, a sensor for detecting the sheet T is arranged at a predetermined position in the second conveyance path 56.

The third conveyance path 57 is formed to extend obliquely upward to the left in FIG. 1 from the exit of the fixing device 9. The third conveyance path 57 includes a vertical conveyance path 57*a* located downstream of the switching claw 58 in the conveying direction and formed to extend upward. The sheet T conveyed by the third conveyance path 57 is conveyed substantially vertically upward and discharged to the outside of the apparatus main body M after passing above the switching claw 58. The third conveyance path 57 includes guide plates and pairs of rollers for conveying the sheet T while guiding it similar to the other conveyance paths.

The return conveyance path 59 is a conveyance path branched off to extend downward from the switching claw 58 opposite to the third conveyance path 57, passing below the fixing device 9, the second conveyance path 56, the secondary transfer roller 8 and the pairs of registration rollers 80, and then extending upward. A downstream end of the return conveyance path 59 joins the curved path 55*a* in the first conveyance path 55. The return conveyance path 59 is a conveyance path which returns the sheet T having passed through the fixing device 9 to a side upstream of the pair of registration rollers 80 arranged upstream of the secondary transfer roller 8 and is used in the case of printing toner images on both sides of the sheet T, i.e. performing duplex printing.

A manual feed unit 64 is provided above the sheet cassettes 52 on the right side surface of the apparatus main body M in FIG. 1. The manual feed unit 64 includes a manual feed tray 65 constituting a side wall in a closed state and a feed roller 66. The bottom end of the manual feed tray 65 is rotatably (openably and closably) mounted near the curved path 55*a* of the first conveyance path 55, and a sheet T manually placed on the manual feed tray 65 in an open state is fed to the curved path 55*a* of the first conveyance path 55.

Next, the reader 301 of the image reading apparatus 300 is described. As shown in FIG. 2, the reader 301 includes a contact glass 335 on which a document G is to be placed, a pair of guide rails 345, a drive shaft 350 having drive pulleys 351 mounted thereon, a supporting shaft 353 having driven pulleys 352 mounted thereon, the illumination unit 347, the mirror unit 349, an imaging lens 357, a CCD 358 and an optical sensor 362.

The contact glass 335 is arranged on the upper surface (front side in a direction perpendicular to the plane of FIG. 2) of the reader 301 and a document G is placed thereon. The contact glass 335 is arranged substantially parallel to a horizontal plane when the image forming apparatus 1 is arranged in a normal state. The pair of guide rails 345 are arranged to extend between side surfaces 306*a*, 306*b* (left and right in FIG. 2) of the reader 301. The pair of guide rails 345 are disposed parallel to the above contact glass 335. The illumination unit 347 and the mirror unit 349 are movably placed on the pair of guide rails 345.

The drive shaft 350 is so arranged near the side surface 306a as to be perpendicular to the guide rails 345. The drive shaft 350 is driven in forward and reverse directions by an unillustrated drive motor. The drive pulleys 351 each having a large diameter portion and a small diameter portion are mounted on the both ends of the drive shaft 350 and at the outer sides of the guide rails 345 in a main scanning direction Y.

The supporting shaft 353 is so arranged near the side surface 306b as to be perpendicular to the guide rails 345. The driven pulleys 352 having the same diameters as the drive pulleys 351 are mounted on the both ends of the supporting shaft 353 and at the outer sides of the guide rails 345 in the main scanning direction Y. Drive wires 354a are mounted on the large diameter portions of the drive pulleys 351 and the driven pulleys 352. The illumination unit 347 is fixed to the drive wires 354a. Further, drive wires 354b are mounted on the small diameter portions of the drive pulleys 351 and the driven pulleys 352. The mirror unit 349 is fixed to the drive wires 354b.

By rotating the drive shaft 350 by the drive motor, the drive wires 354a, 354b are rotated. By the rotation of the drive wires 354a, 354b, the illumination unit 347 and the mirror unit 349 move along the guide rails 345 in the sub scanning direction X (lateral direction in FIG. 2). If a ratio of the diameter of the large diameter portions to that of the small diameter portions of the drive pulleys 351 and the driven pulleys 352 is, for example, 2:1, a ratio of movement distances of the illumination unit 347 and the mirror unit 349 is 2:1.

Two contacts 355 are provided on each part of the illumination unit 347 and the mirror unit 349 held in contact with the upper surfaces of the guide rails 345. Contact surfaces of the respective contacts 355 with the guide rails 345 are spherical. This enables the illumination unit 347 and the mirror unit 349 to smoothly move in the sub scanning direction X.

An ISU base 356 as a supporting member is mounted near the side surface 306a on the bottom surface of the reader 301. The imaging lens 357 and the CCD 358 are mounted in a predetermined positional relationship on the upper surface of the ISU base 356.

The imaging lens 357 is disposed on a lens support mount 359 fixed to the ISU base 356. The lens support mount 359 is arranged on the ISU base 356 in such a state that the position thereof is adjustable by a guide member 360 arranged on the CCD 358. The imaging lens 357 is arranged substantially in the center of the reader 301 in the sub scanning direction X and at an end of an optical path H (see FIG. 3) opposite to the document G. The imaging lens 357 images reflected light H4 (see FIG. 3) incident thereon at a predetermined position. That is, the imaging lens 357 images an image of the document G at the predetermined position.

The CCD 358 is mounted on a CCD substrate 361 arranged on the rear surface of the guide member 360 and arranged at an imaging position of the imaging lens 357. Light emerging from the imaging lens 357 is incident on the CCD 358 through an opening window 360a formed near the center of the guide member 360. The positions of an optical path of reflected light H1 to H4 reflected by the document G and propagating toward the CCD 358 and an incident surface of the CCD 358 can be corrected by finely adjusting the position of the guide member 360. The optical sensor 362 is arranged on the ISU base 356 and detects the size of a document (in the lateral direction of FIG. 2) based on whether or not to receive the reflected light from the document G placed on the contact glass 335.

Next, the illumination unit 347 is described. The illumination unit 347 includes an illuminator 347a, a first mirror 347b and a first frame body 347c for housing the illuminator 347a and the first mirror 347b. The illuminator 347a includes a plurality of LEDs 501, a light guide 505 arranged in proximity to or in contact with the plurality of LEDs 501 and having a first light emitting surface 411 and a second light emitting surface 412, and a reflecting mirror 541 (reflecting member) for irradiating a document with light from the second light emitting surface 412. The illuminator 347a is described in detail later.

The first mirror 347b is arranged at a lower side of the illumination unit 347 in a thickness direction Z such that a reflecting surface is faced toward the document G and a second mirror 349a. The first mirror 347b reflects the reflected light H1 toward the second mirror 349a.

The first frame body 347c houses the illuminator 347a and the first mirror 347b and is fixed to the drive wires 354a mounted on the large diameter portions of the drive pulleys 351 and the driven pulleys 352. By rotating the drive wires 354a, 354b, the first body 347c is moved in the sub scanning direction X along the guide rails 345.

The mirror unit 349 includes the second mirror 349a, a third mirror 349b, and a second frame body 349c for housing the second mirror 349a and the third mirror 349b. The second mirror 349a is arranged at an upper side of the second frame body 349c in the thickness direction Z. The second mirror 349a is arranged such that a reflecting surface is faced toward the first mirror 347b and the third mirror 349b. The second mirror 349a reflects the reflected light H2 from the first mirror 347b toward the third mirror 349b.

The third mirror 349b is arranged at a lower side of the second frame body 349c in the thickness direction Z such that a reflecting surface is faced toward the second mirror 349a and the imaging lens 357. The third mirror 349b reflects the reflected light H3 from the second mirror 349a toward the imaging lens 357.

The first mirror 347b, the second mirror 349a and the third mirror 349b are a plurality of mirrors for forming the optical path H along which light reflected by a document G is reflected and introduced to the imaging lens 357. Note that although the plurality of mirrors are illustrated in this embodiment, the optical path H may be formed by one mirror. Since the illumination unit 347 moves at a speed A in the sub scanning direction X and the mirror unit 349 moves at a speed A/2 in the sub scanning direction X as described above, the length of the optical path H is kept constant also during an image reading operation.

Figure 4:
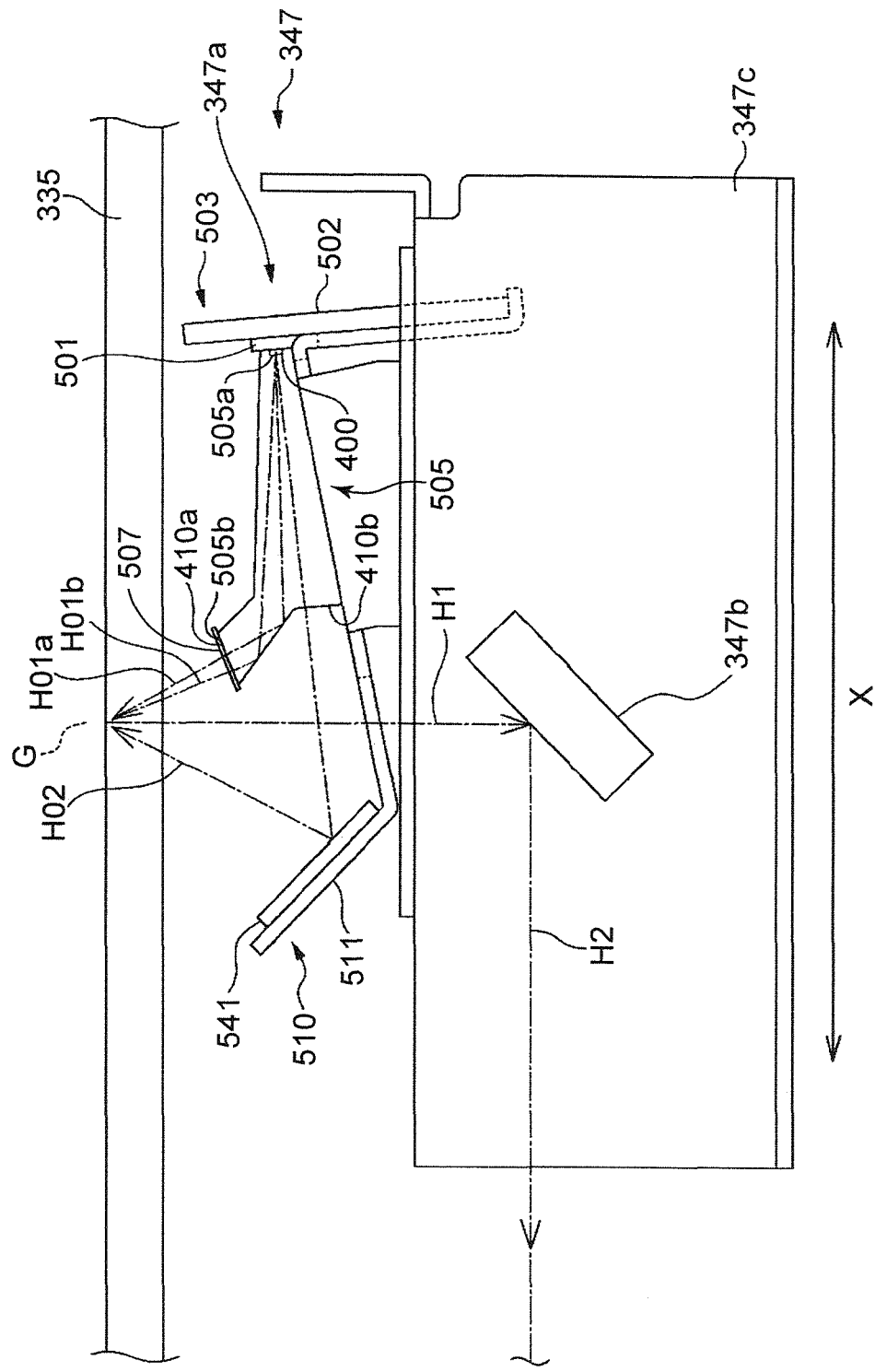
FIG. 4 is a side view in section showing the construction of an illuminator.
Figure 5:
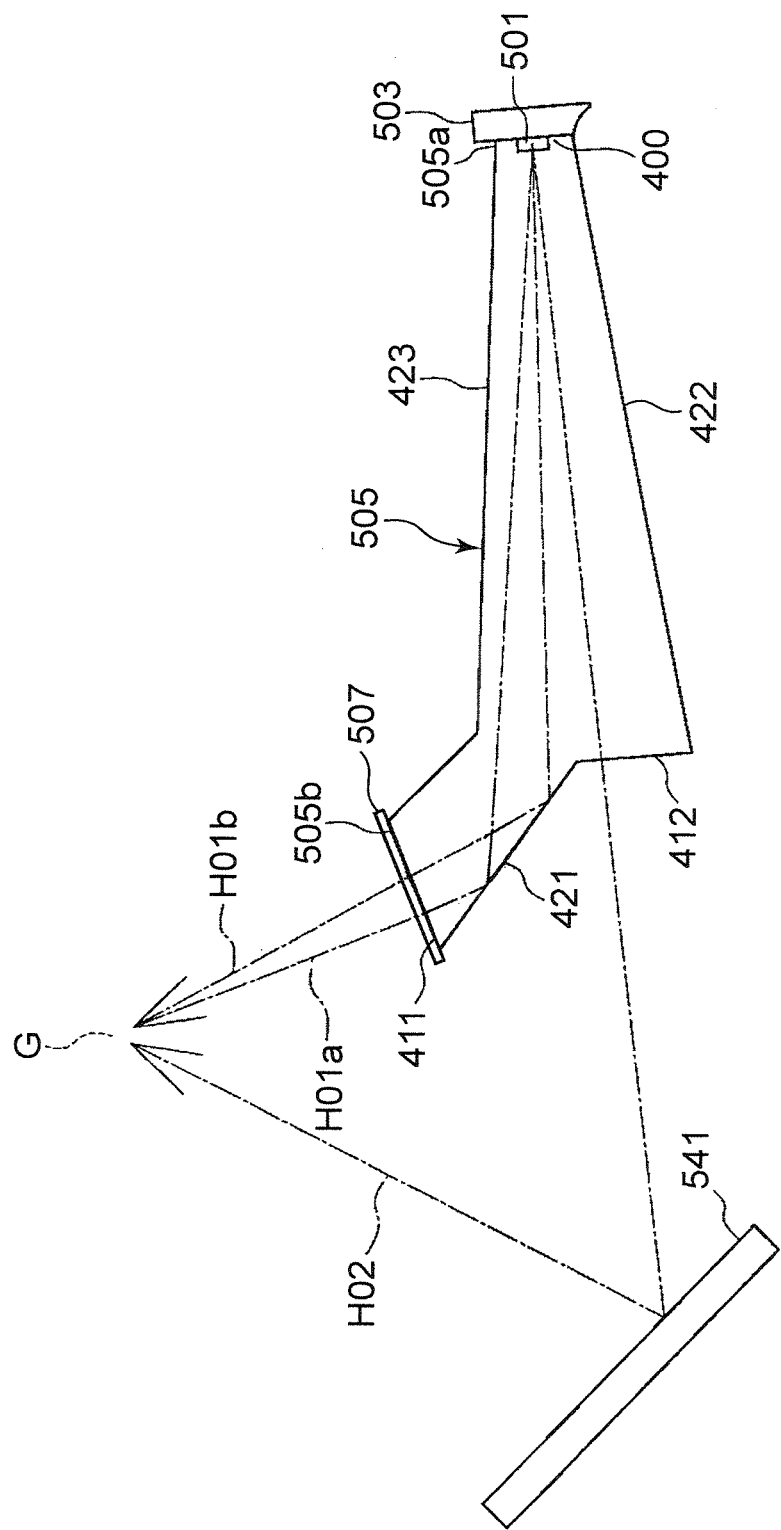
FIG. 5 is a partial enlarged view of a light guide shown in FIG. 3.

FIG. 4 is a sectional view showing the construction of the illuminator 347a. FIG. 5 is a partial enlarged view showing the light guide 505 in FIG. 4. The illuminator 347a includes a LED unit 503 having the plurality of LEDs 501 mounted thereon, the light guide 505 having the first and second light emitting surfaces 411, 412, the reflecting mirror 541 (reflecting member) for reflecting light emitted from the second light emitting surface 412 toward a document, and a mounting member 510 on which the LED unit 503, the light guide 505 and the reflecting mirror 541 are mounted.

Figure 6:
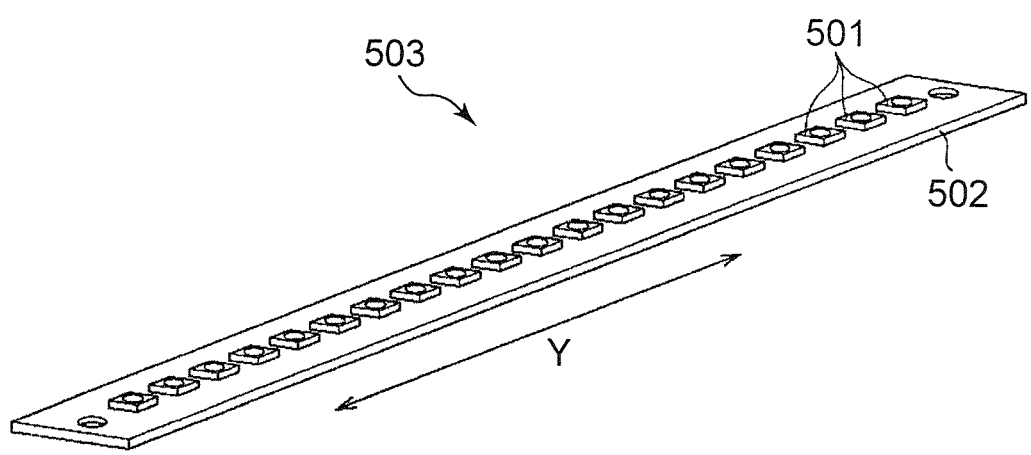
FIG. 6 is a perspective view of a LED unit shown in FIG. 3, FIGS. 7(1) to (7) are views showing optical paths of light incident on a light incident surface in the light guide.

FIG. 6 is a perspective view showing the LED unit 503. The plurality of LEDs 501 are arranged at specified intervals in the main scanning direction Y and mounted on the mounting member 510 made of metal and having a high rigidity via a plate-like member 502.

The light guide 505 is a plate-like member long in the main scanning direction Y, has a substantially L-shaped side view and is arranged between the LED unit 503 and the contact glass 335 on which a document G is to be placed. That is, the light guide 505 is so arranged that one end 505a (light source side) thereof faces toward the LED unit 503 on which the plurality of LEDs 501 are arranged, and other end 505b (document side) thereof faces toward the contact glass 335. Roughly speaking, the one end 505a is facing in a vertical direction and the other end 505b is facing upward.

The light guide 505 has a light incident surface 400 formed on the one end 505a, the first light emitting surface 411 formed on the other end 505b and the second light emitting surface 412 formed below the first light emitting surface 411. The light guide 505 also has a first reflecting surface 421, a second reflecting surface 422 and a third reflecting surface 423 for reflecting light incident on the light incident surface 400 and causing the light to be emitted from the first light emitting surface 411.

The light incident surface 400 is arranged to face the plurality of LEDs 501 and light emitted from the plurality of LEDs 501 is incident thereon. In this embodiment, the light incident surface 400 has a surface including a recess capable of accommodating the plurality of LEDs 501 and having this recess covered by the plurality of LEDs 501. Light emitted from the plurality of LEDs 501 is introduced to the interior of the light guide 505 through this light incident surface 400.

The first light emitting surface 411 is arranged to face the document G and light incident on the light incident surface 400 and reflected by the first reflecting surface 421 is emitted therefrom. In other words, the first light emitting surface 411 is a flat surface whose angle with respect to a horizontal plane or a vertical plane is so set as to reflect the light reflected by the first reflecting surface 421 and prevent this light from returning to the interior of the light guide 505. In this embodiment, the first light emitting surface 411 is a flat surface moderately inclined upward toward a side where the LEDs 501 are arranged when viewed sideways as shown in FIGS. 4 and 5.

The first reflecting surface 421 is oriented in a part where the second light emitting surface 412 is not oriented on a side opposite to the one facing the plurality of LEDs 501, and oriented at an angle to reflect the light received thereby toward the first light emitting surface 411. That is, the first reflecting surface 421 is a flat surface connecting the first and second light emitting surfaces 411, 412. Note that the first reflecting surface 421 only has to be arranged between the first and second light emitting surfaces 411, 412, and another flat surface, a concave or convex surface, a rectangular surface or the like may be provided between the first reflecting surface 421 and the first light emitting surface 411 or between the first reflecting surface 421 and the second light emitting surface 412.

Light H01a, H01b emitted from the first light emitting surface 411 is light reflected by the first reflecting surface 421. FIGS. 7(1) to (7) are views showing optical paths in the light guide 505 of light incident on the light incident surface 400. Out of FIGS. 7(1) to (7), FIG. 7(3) shows an optical path of light incident on the light incident surface 400 and emitted from the first light emitting surface 411 after being reflected once by the first reflecting surface 421.

The second light emitting surface 412 is a flat surface which is provided on a surface different from the one including the first light emitting surface 411, and light is emitted therefrom. The second light emitting surface 412 is arranged to face the reflecting mirror 541 and causes light incident on the light incident surface 400 to be emitted toward the reflecting mirror 541. In this embodiment, the second light emitting surface 412 and the light incident surface 400 are substantially parallel. The light emitted from the second light emitting surface 412 is reflected toward the document G by the reflecting mirror 541, and the light H02 reflected by the reflecting mirror 541 irradiates the document G from a side different from the light H01a, H01b emitted from the first light emitting surface 411. FIG. 7(4) shows an optical path of light incident on the light incident surface 400 and emitted from the second light emitting surface 412 without being reflected by any surface (number of reflection: 0).

The second reflecting surface 422 is a surface connecting the light incident surface 400 and the second light emitting surface 412 and formed at an angle to reflect light received thereby toward any one of the second light emitting surface 412, the first reflecting surface 421 and the third reflecting surface 423. Note that the second reflecting surface 422 only has to be arranged between the light incident surface 400 and the second light emitting surface 412, and another flat surface, a concave or convex surface, a rectangular surface or the like may be provided between the second reflecting surface 422 and the light incident surface 400 or between the second reflecting surface 422 and the second light emitting surface 412.

FIG. 7(5) shows an optical path of light incident on the light incident surface 400 and emitted from the second light emitting surface 412 after being reflected once by the second reflecting surface 422. Further, FIG. 7(6) shows an optical path of light incident on the light incident surface 400 and emitted from the first light emitting surface 411 after being reflected by the second reflecting surface 422 and further by the first reflecting surface 421. In this case, the number of reflections is two.

The third reflecting surface 423 is a surface facing the second reflecting surface 422 and formed at an angle to reflect light received thereby toward either the second light emitting surface 412 or the first reflecting surface 421. In this embodiment, the third reflecting surface 423 is a surface inclined upward so that a vertical width of the light guide 505 increases from the one end 505a toward the other end 505b.

FIG. 7(1) shows an optical path of light incident on the light incident surface 400 and emitted from the second light emitting surface 412 after being reflected once by the third reflecting surface 423. Further, FIG. 7(2) shows an optical path of light incident on the light incident surface 400 and emitted from the first light emitting surface 411 after being reflected by the third reflecting surface 423 and further by the first reflecting surface 421. In this case, the number of reflections is two. Further, FIG. 7(7) shows an optical path of light incident on the light incident surface 400 and emitted from the first light emitting surface 411 after being reflected by the second reflecting surface 422, then by the third reflecting surface 423 and further by the first reflecting surface 421. In this case, the number of reflections is three.

In this way, the light reflected by the third reflecting surface 423 is either reflected toward the first reflecting surface 421 or emitted from the second light emitting surface 412 as shown in FIG. 7(1). On the other hand, the light reflected by the second reflecting surface 422 is either reflected toward the first reflecting surface 421 or emitted from the second light emitting surface 412 as shown in FIG. 7(5). Further, the light reflected by the first reflecting surface 421 is emitted from the first light emitting surface 411 as shown in FIGS. 7(2), 7(3), 7(6) and 7(7). That is, light emitted from the LEDs 501 is emitted toward the document from the first or second light emitting surface 411 or 412 after being reflected at most three times, mostly at most twice.

In other words, the first, second and third reflecting surfaces 421, 422 and 423 are set to form such optical paths that the light introduced into the light guide 505 from the light incident surface 400 is reflected three times or less by the first, second or third reflecting surface 421, 422 or 423 until being emitted from the first or second light emitting surface 411 or 412. These numbers of reflections are drastically less as compared with conventional numbers of reflections. By suppressing the number of reflections in the light guide 505, irradiation efficiency on a document surface can be increased and light of the LEDs 501 can be effectively utilized.

Further, a ratio of light emitted from the first light emitting surface 411 (direct light) and light emitted from the second light emitting surface 412 (indirect light) can be set at a desired ratio by adjusting the angles of the second and third reflecting surfaces 422 and 423. In this way, if a document has a pasted part (if a sheet piece is pasted to a document sheet to form a small projection), the ratio of direct light and indirect light can be adjusted to reduce shade caused by this pasted part and a document image with good image quality can be obtained.

An elliptical diffuser 507 is attached, for example, by adhesive or adhesive tape in a state placed on the other end 505b of the light guide 505. The elliptical diffuser 507 is so formed that a light diffusion rate in a predetermined direction differs from that in another direction perpendicular to the predetermined direction.

Figure 8:
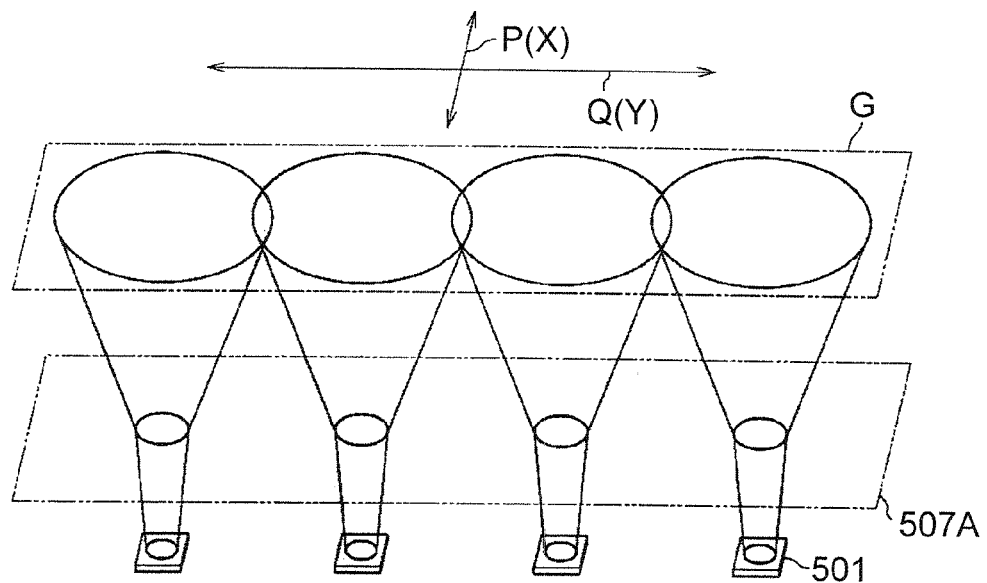
FIG. 8 is a diagram showing a diffused state of light in the case of using a diffuser.

Here, the elliptical diffuser 507 is described in comparison to a conventional diffuser 507A. As shown in FIG. 8, the conventional diffuser 507A equally diffuses light from the LEDs 501. That is, the diffuser 507A has a function of diffusing the light from the LEDs 501 more than natural diffusion.

Figure 9:
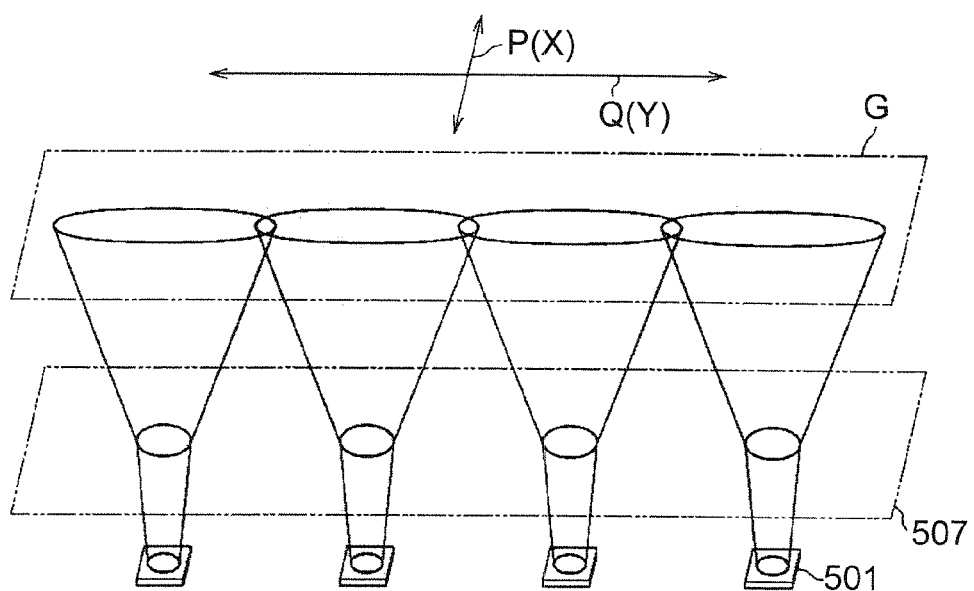
FIG. 9 is a diagram showing a diffused state of light in the case of using an elliptical diffuser.
Figure 12:
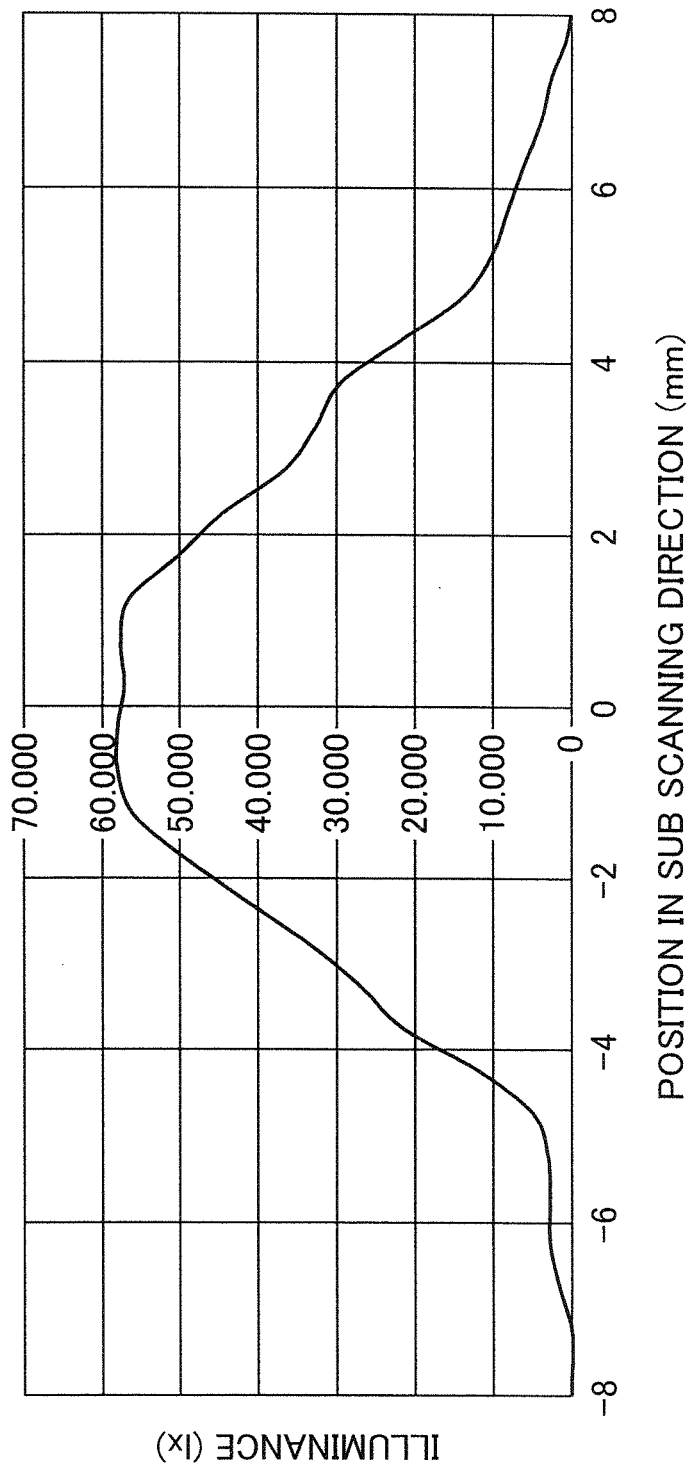
FIG. 12 is a cross-sectional light distribution graph in a sub scanning direction on a document surface.

On the other hand, the elliptical diffuser 507 is a diffuser formed to diffuse light from the LEDs 501 at different light diffusion rates in a predetermined direction P and another direction Q perpendicular to the predetermined direction P as shown in FIG. 9. Specifically, the elliptical diffuser 507 diffuses the light from the LEDs 501 at a low diffusion rate in the predetermined direction P while diffusing it at a high diffusion rate in the other direction Q. The elliptical diffuser 507 diffuses the light from the LEDs 501 at the high diffusion rate in the other direction Q without substantially diffusing it in the predetermined direction P. In this case, as compared with the case of using the diffuser 507A shown in FIG. 8, light irradiated to the document G is intensified (light quantity is increased). Specifically, first diffused light H01 and second diffused light H02 are intensified and the light irradiated to the document G is intensified. FIG. 12 is a cross-sectional light distribution graph in the sub scanning direction on a document surface. By reducing the number of reflections in the light guide 505 and using the elliptical diffuser 507 in this way, a highly condensed state at an irradiation target position (0 [mm]) is found to be shown.

In this embodiment, the elliptical diffuser 507 is so arranged that the predetermined direction is along the sub scanning direction X and the other direction is along the main scanning direction Y. That is, the elliptical diffuser 507 diffuses light at a low diffusion rate in the sub scanning direction X and diffuses light at a high diffusion rate in the main scanning direction Y.

The elliptical diffuser 507 is arranged at a position in the main scanning direction Y where a light quantity difference is small. Preferably, the elliptical diffuser 507 is arranged at a position in the main scanning direction Y where there is substantially no light quantity difference. Here, why it is preferable to arrange the elliptical diffuser 507 at the position in the main scanning direction Y where a light quantity difference is small is described.

Figure 10:
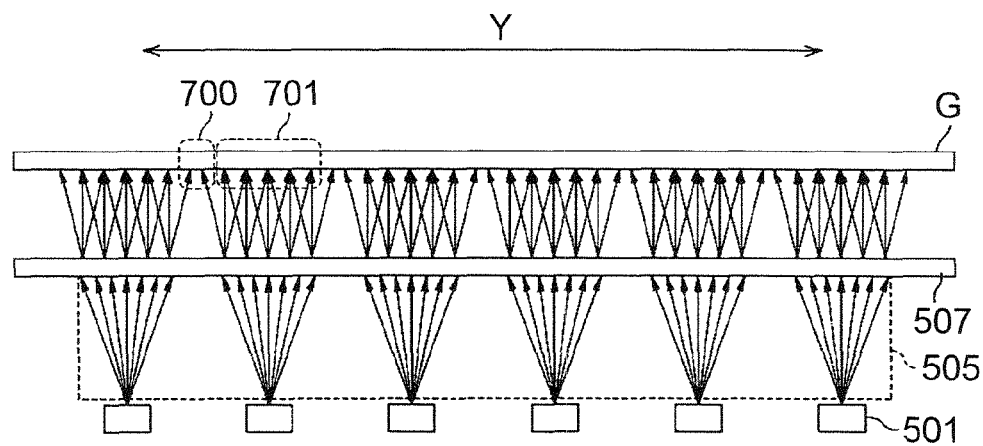
FIG. 10 is a diagram showing an example of an arrangement position of the elliptical diffuser.

In the case of arranging the elliptical diffuser 507 at a position where light from the LEDs 501 is not sufficiently diffused (position where there is a light quantity difference) as shown in FIG. 10, there are parts 700 with less light quantity and parts 701 with more light quantity in light diffused by the elliptical diffuser 507 and irradiated to the document G. That is, there is light quantity unevenness in the main scanning direction Y in the light irradiated to the document G.

Here, in the case of irradiating light to a glossy black document G curled to project vertically upward (upward in FIG. 1), regularly reflected light from the document G is incident on the CCD 358. In this case, since there is light quantity unevenness in the light irradiated to the document G, as many point-like flare images as the LEDs 501 are formed in a read image.

Figure 11:
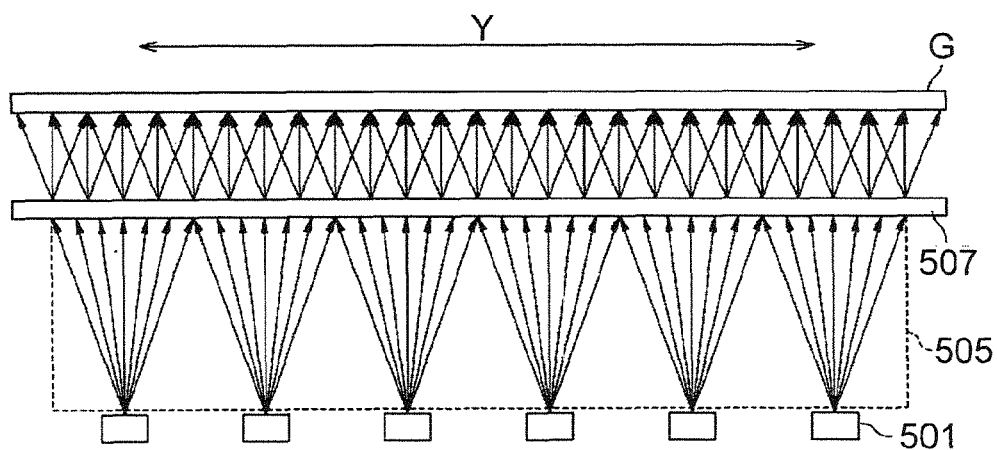
FIG. 11 is a diagram showing another example of the arrangement position of the elliptical diffuser.

On the other hand, in the case of arranging the elliptical diffuser 507 at a position where light from the LEDs 501 is sufficiently diffused (at a position where a light quantity difference is small) as shown in FIG. 11, the light irradiated to the document G is diffused to reduce the light quantity difference by the elliptical diffuser 507. That is, the light irradiated to the document G becomes substantially uniform in the main scanning direction Y. In this case, even if the light is irradiated to the curled glossy black document G and the regularly reflected light is incident on the CCD 358, no point-like flare images are formed in a read image.

From the above, the elliptical diffuser 507 is arranged at the position in the main scanning direction Y where the light quantity difference is small, preferably at the position where there is substantially no light quantity difference in the main scanning direction Y. Here, the light guide 505 is set to have such a length as to eliminate the light quantity difference in the light incident on the elliptical diffuser 507 (length of the optical path from the light incident surface 400 to the first light emitting surface 411).

The reflecting mirror 541 is mounted on a mirror holder 511 in the mounting member 510 and arranged such that a reflecting surface faces toward the second light emitting surface 412 and the document G. That is, the reflecting mirror 541 is arranged at a side of the reflected light H01 opposite to the light guide 505 in the sub scanning direction X, and reflects the light emitted from the second light emitting surface 412 toward the document G.

From the above, the light H01a, H01b emitted from the first light emitting surface 411 is irradiated to the document G from one side in the sub scanning direction X. Further, the light emitted from the second light emitting surface 412 is reflected by the reflecting mirror 541 and irradiated to the document G from the other side in the sub scanning direction X. The light H01a, H01b and the light H02 are respectively irradiated to the document G from the one and other sides in the sub scanning direction X. By doing so, it is possible to suppress generation of edge shadows in a read image.

Note that the mounting member 510 is arranged above the first frame body 347c (upper side in FIG. 4). The LED unit 503, the light guide 505 and the reflecting mirror 541 are mounted on the mounting member 510. The plurality of LEDs 501 are mounted on the mounting member 510 via the LED unit 503.

As described above, the first reflecting surface 421 of the light guide 505 is oriented to reflect light received thereby toward the first light emitting surface 411, the second reflecting surface 422 is oriented to reflect light received thereby toward any one of the second light emitting surface 412, the first reflecting surface 421 and the third reflecting surface 423, and the third reflecting surface 423 is oriented to reflect light received thereby toward either the second light emitting surface 412 or the first reflecting surface 421. In this way, the document can be irradiated with light incident on the light incident surface 400, reflected three times or less, mostly twice or less in the light guide 505 and emitted from the first or second light emitting surface 411 or 412. By suppressing the number of reflections in the light guide 505 in this way, irradiation efficiency on the document surface can be increased and light of the LEDs 501 can be effectively utilized. Further, since the irradiation efficiency on the document surface can be increased, the illumination unit 347 can be made smaller than before.

Further, by disposing the elliptical diffuser 507 for diffusing light at a low diffusion rate in the sub scanning direction X and at a high diffusion rate in the main scanning direction Y on the first light emitting surface 411, light irradiated to the document G is diffused to reduce a light quantity difference. That is, the light irradiated to the document G becomes substantially uniform in the main scanning direction Y and a document image with good image quality can be obtained.

This application is based on Japanese Patent application No. 2010-266308 filed in Japan Patent Office on Nov. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus for optically reading an image of a document, comprising:
    a light source for emitting light for irradiating the document;
    a light guide arranged between the light source and the document and having a light incident surface on which light emitted from the light source is incident at a side of the light source, a first light emitting surface from which the light is emitted at a side of the document, a second light emitting surface which is located on a surface different from the one including the first light emitting surface and from which the light is emitted, a first reflecting surface arranged between the first and second light emitting surfaces, a second reflecting surface arranged between the light incident surface and the second light emitting surface, and a third reflecting surface facing the second reflecting surface;
    a reflecting member for reflecting light emitted from the second light emitting surface toward the document;
    one or more mirrors for forming an optical path by reflecting light reflected by the document;
    an imaging lens for imaging the light reflected by the one or more mirrors; and
    an image reader arranged at an imaging position of the imaging lens and adapted to read the image of the document based on imaging by the imaging lens;
    wherein:
    the first reflecting surface is oriented to reflect light received thereby toward the first light emitting surface;
    the second reflecting surface is oriented to reflect light received thereby toward any one of the second light emitting surface, the first reflecting surface and the third reflecting surface; and
    the third reflecting surface is oriented to reflect light received thereby toward either the second light emitting surface or the first reflecting surface.

2. An image reading apparatus according to claim 1, wherein the first reflecting surface is a surface connecting the first and second light emitting surfaces.

3. An image reading apparatus according to claim 1, wherein the second reflecting surface is a surface connecting the light incident surface and the second light emitting surface.

4. An image reading apparatus according to claim 1, wherein the first, second and third reflecting surfaces are so set as to form an optical path along which light introduced into the light guide from the light incident surface is reflected three times or less by the first, second or third reflecting surface until being emitted from the first or second light emitting surface.

5. An image reading apparatus according to claim 4, wherein the optical path includes an optical path of light incident on the light incident surface and emitted toward the reflecting member from the second light emitting surface without being reflected by any surface.

6. An image reading apparatus according to claim 4, wherein the optical path includes:
    an optical path of light incident on the light incident surface and emitted toward the document from the first light emitting surface after being reflected by the first reflecting surface;
    an optical path of light incident on the light incident surface and emitted toward the reflecting member from the second light emitting surface after being reflected by the second reflecting surface; and
    an optical path of light incident on the light incident surface and emitted toward the reflecting member from the second light emitting surface after being reflected by the third reflecting surface.

7. An image reading apparatus according to claim 4, wherein the optical path includes:
    an optical path of light incident on the light incident surface and emitted toward the document from the first light emitting surface after being reflected by the second reflecting surface and further by the first reflecting surface; and
    an optical path of light incident on the light incident surface and emitted toward the document from the first light emitting surface after being reflected by the third reflecting surface and further by the first reflecting surface.

8. An image reading apparatus according to claim 4, wherein the optical path includes an optical path of light incident on the light incident surface and emitted toward the document from the first light emitting surface after being reflected by the second light emitting surface, then by the third reflecting surface and further by the first reflecting surface.

9. An image reading apparatus according to claim 1, further comprising:
    a diffuser which covers the first light emitting surface and has a high light diffusion rate in a main scanning direction and a low light diffusion rate in a sub scanning direction.

10. An image forming apparatus, comprising:
    an image reading apparatus for optically reading an image of a document; and
    an image forming unit for forming an image on a sheet based on an image read by the image reading apparatus,
    the image reading apparatus including:
        a light source for emitting light for irradiating the document;
        a light guide arranged between the light source and the document and having a light incident surface on which light emitted from the light source is incident at a side of the light source, a first light emitting surface from which the light is emitted at a side of the document, a second light emitting surface which is located on a surface different from the one including the first light emitting surface and from which light is emitted, a first reflecting surface arranged between the first and second light emitting surfaces, a second reflecting surface arranged between the light incident surface and the second light emitting surface, and a third reflecting surface facing the second reflecting surface;

a reflecting member for reflecting light emitted from the second light emitting surface toward the document;

one or more mirrors for forming an optical path by reflecting light reflected by the document;

an imaging lens for imaging the light reflected by the one or more mirrors; and an image reader arranged at an imaging position of the imaging lens and adapted to read the image of the document based on imaging by the imaging lens;

wherein:

the first reflecting surface is oriented to reflect light received thereby toward the first light emitting surface;

the second reflecting surface is oriented to reflect light received thereby toward any one of the second light emitting surface, the first reflecting surface and the third reflecting surface; and the third reflecting surface is oriented to reflect light received thereby toward either the second light emitting surface or the first reflecting surface.

* * * * *